UNITED STATES PATENT OFFICE.

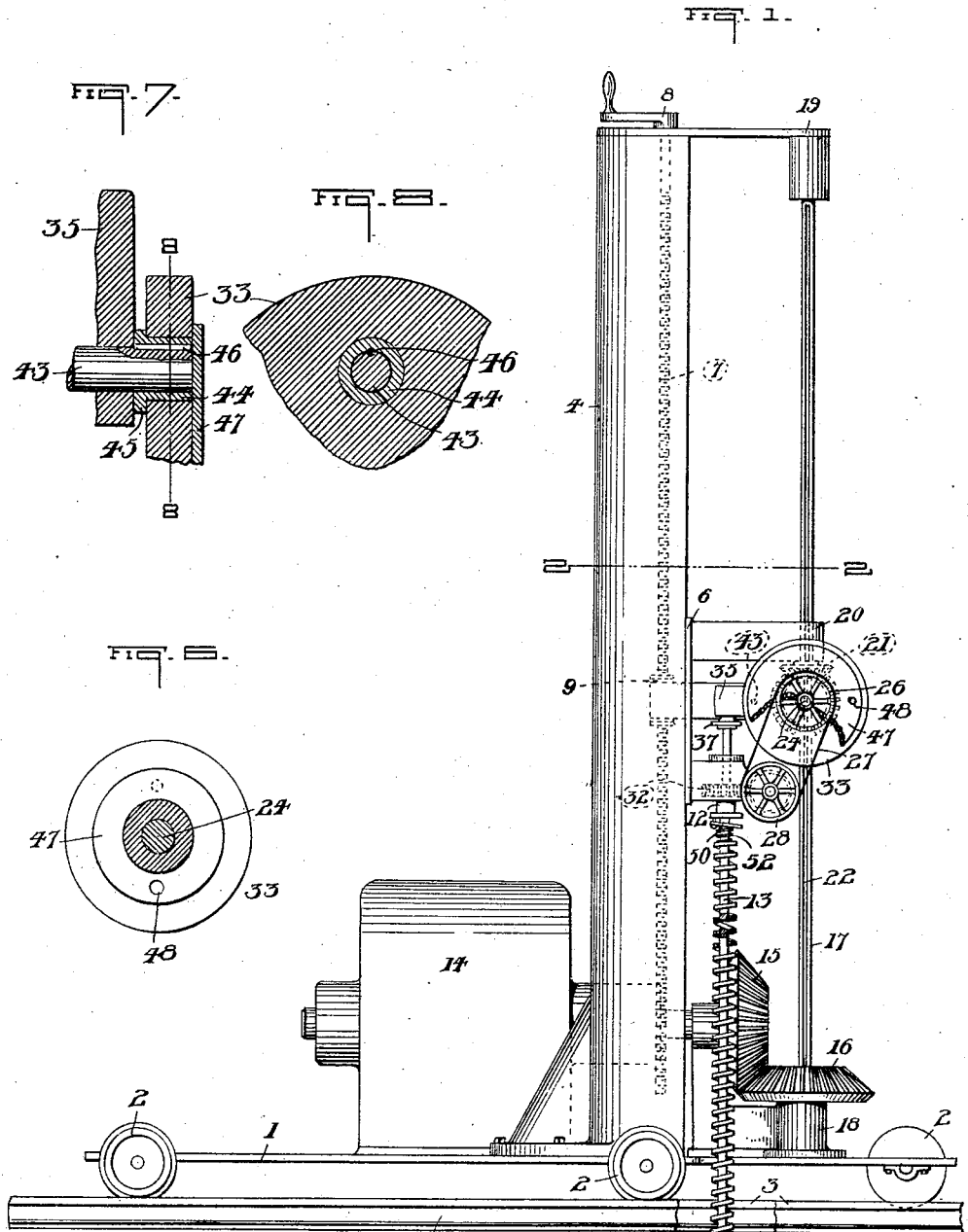
No. 880,140. PATENTED FEB. 25, 1908.
B. HASTINGS.
DRILLING MACHINE.
APPLICATION FILED DEC. 7, 1906.
2 SHEETS—SHEET 1.

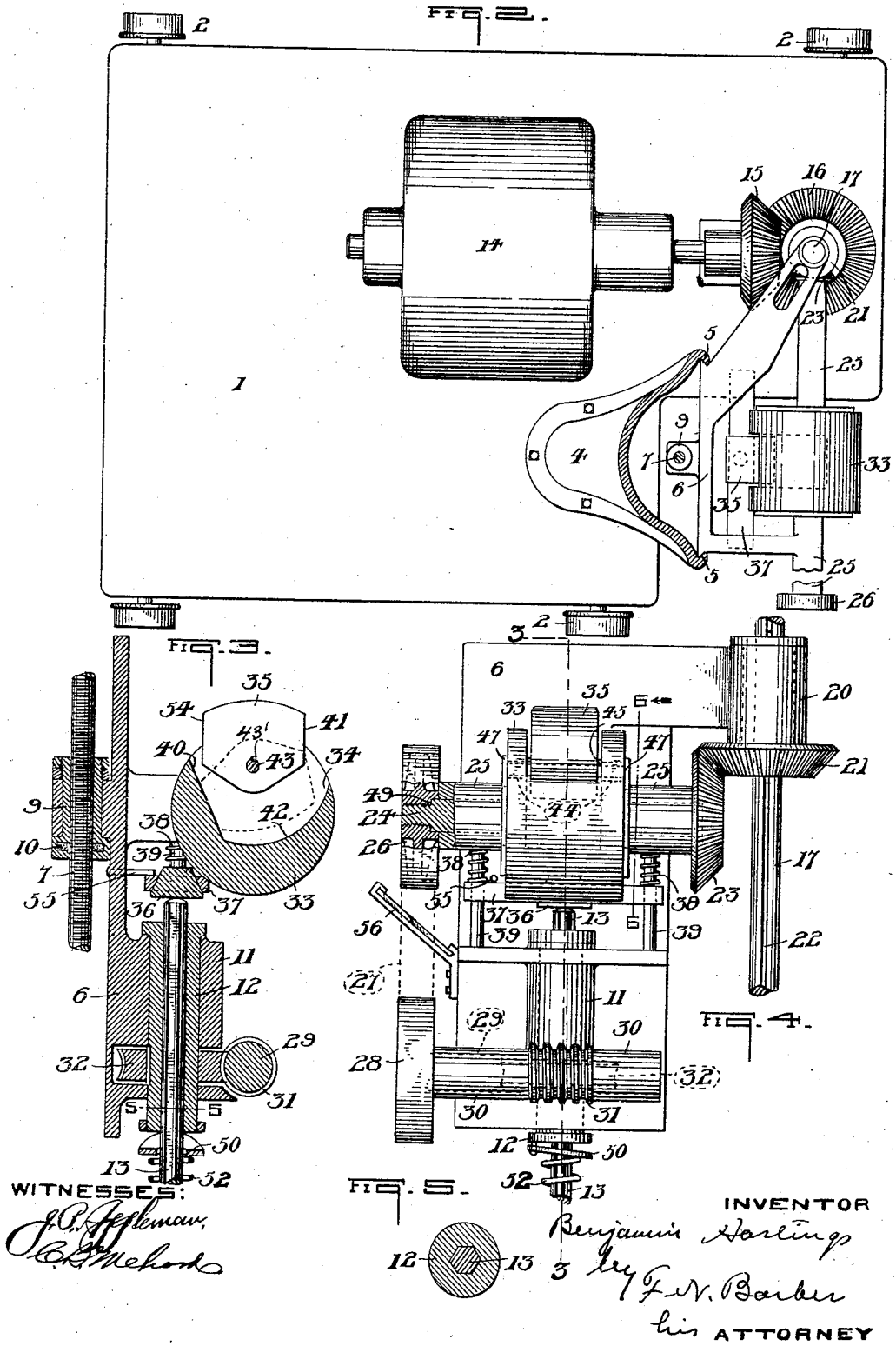

BENJAMIN HASTINGS, OF CLEVELAND, OHIO, ASSIGNOR TO THE ELECTRIC CONTROLLER AND SUPPLY COMPANY, OF CLEVELAND, OHIO, A CORPORATION OF OHIO.

DRILLING-MACHINE.

No. 880,140.  Specification of Letters Patent.  Patented Feb. 25, 1908.

Application filed December 7, 1906. Serial No. 346,750.

*To all whom it may concern:*

Be it known that I, BENJAMIN HASTINGS, a citizen of the United States, residing at Cleveland, in the county of Cuyahoga and State of Ohio, have invented or discovered new and useful Improvements in Drilling-Machines, of which the following is a specification.

My invention relates to drilling machines, in which the drilling tool is struck by a centrifugal hammer, but some of its features are not limited in their use to a drilling machine of this character.

The objects of my invention are chiefly to provide improved means for rotating the hammer, transmitting power to the hammer-shaft, feeding the hammer and drilling tool towards the material to be drilled, rotating the drilling tool, clearing the drilled hole of drill cuttings, keeping the drilling tool and the hammer in relatively fixed position so as to cause the hammer to strike its blow uniformly at its most advantageous position, supporting the hammer suitably, protecting the struck end of the drilling tool, withdrawing the same from the drilled hole, and cleaning and oiling the feed-screw. I attain these objects preferably by the mechanism shown on the accompanying drawings, in which—

Figure 1 is a side elevation of my improved drilling machine, the material drilled being broken away to show the drilling tool in the drilled hole; Fig. 2, a section on the line 2—2 of Fig. 1; Fig. 3, a section on the line 3—3 of Fig. 4; Fig. 4, an elevation, partly broken away, of the hammer-operating means and the parts associated therewith; Fig. 5, a section on the line 5—5 of Fig. 3; Fig. 6, a section on the line 6—6 of Fig. 4, showing the means for retaining the hammer-securing pin removably in position; Fig. 7, a detail in section to show the bearing for the hammer pin 43; and Fig. 8, a section on the line 8—8 of Fig. 7.

On the drawings, 1 is a carriage having the wheels 2, adapted to run on the rails 3 (Fig. 1) in order that the drilling machine may be moved along to drill a number of holes in line and to remove the machine from over the drilling tool, when it is desired to remove the latter while the machine is over the material drilled, as will be explained hereinafter.

The carriage supports the vertical column 4 having the vertical guide-ways 5, in which the tool-carriage 6 may travel as it is fed up and down by the feed-screw 7, supported in the column and actuated by the crank 8. The feed-screw works in the nut 9 carried by the carriage 6, the nut having a cavity around the screw filled with an oil-bearing packing 10, which cleans the screw from sand and simultaneously lubricates the same.

The carriage 6 has the bearing 11 which supports therein the vertical sleeve 12 carrying the drilling-tool 13. The latter has a polygonal or other cross-section and the vertical hole in the sleeve has a corresponding cross-section, whereby the tool may have longitudinal travel in the sleeve but no rotary movement independently of the sleeve.

The carriage 1 supports the electric-motor 14, to whose armature shaft is secured the bevel gear 15 meshing with the bevel gear 16 fastened to the vertical shaft 17 having a lower bearing in the step 18 and an upper bearing in the horizontal arm 19 extending from the upper end of the column 4.

The tool-carriage 6 has the bearing 20, in which the journal of the bevel gear 21 rotates. The gear 21 slides up and down on the shaft 17 as the carriage 6 travels along the column 4 and contains a key which rides in the slot 22 in the shaft 17 in order that the latter may transmit its rotary motion to the gear 21. The latter gear meshes with the bevel-gear 23 on the horizontal hammer shaft 24, rotarily supported in the bearings 25 on the carriage 6.

The hammer shaft 24 carries at its end opposite the gear 23 the pulley 26 which is geared by the belt 27 to the pulley 28 on the shaft 29 supported in the bearings 30 on the carriage 6. The shaft 29 bears the worm 31 which gears with the worm-wheel 32 fixed on the sleeve 12, as shown in Fig. 3, whereby the tool 13 may be rotated. The shaft 24 carries an enlarged cylindrical head 33 having therein the eccentric recess 34, in which the centrifugal hammer 35 is pivoted. As the shaft 24 rotates, the hammer 35 under the action of centrifugal force flies out of the recess 34, and strikes the cap 36 which sits on the upper end of the drilling tool 13. This cap prevents injury to the said tool and permits it to be lowered through the hole in the sleeve 12, which preferably fits around the tool. The cap 36 is held closely against the end of the tool by means of the yoke or plate 37 which has an opening therein to receive the tapered exterior of the cap and is pressed downwardly by the springs 38 which surround the pins 39 serving as guides for the plate. The pins 39 are carried by the carriage 6.

Preferably the recess 34 has the thick wall 40 toward the leading side of the hammer 35 and the latter has its rear side 41 shaped to strike flatly against the wall 40 upon the rebound of the hammer after striking the cap 36, as shown in dotted lines in Fig. 5. This thick wall with the thick wall 42 which is left as thick as possible, takes up a large part of the shock due to the inertia of the rebounding hammer.

The pin 43, on which the hammer 35 is secured by the key $43^1$ has its ends in the bushings 44 in the head 33. These bushings have each a flange 45 between the hammer and the adjacent side wall of the recess 34, and are secured to the ends of the pin 43 by means of the keys 46, the bushings having oscillatory motion in the cylinder as the latter rotates.

A metal disk 47 on the shaft 24 lies against each end of the cylinder 33 and is large enough to cover the end of the pin 43 adjacent to it. Each disk has an opening 48 which may be brought by rotation of the disk so as to stand in line with the said pin 43. When the openings in the disks are both brought in line with the pin, the latter may be driven out of the head 33.

The pulley 26 is shown secured to the shaft 24 by screwing the end of the latter into the central opening in the former. In order to prevent any flowing of the metal of the shaft 24 so as to wedge the shaft in the pulley, I prefer to seat the shaft in a recess, as 49. By reason of the recess the metal is so confined that it cannot flow into the threaded opening of the pulley so as to prevent its easy removal. I have tried many methods of securing the pulleys and the gear-wheels to their shafts, but have found the screw-threaded connection the most satisfactory. While the common fastenings may be used, they are not so well able to withstand the instantaneous shocks transmitted from the hammer. The tool 13 passes through the ring clutch 50 preferably secured by one side to the bottom of the sleeve 12. By means of this clutch the tool may be lifted with the carriage 6.

51 is a removable metal spiral which is slid over the drilling tool and is caused to rotate therewith preferably by means of the lower end of the spiral being extended vertically downwards flat against the lip of the tool. However, the spiral may be otherwise caused to rotate with the tool and might be integral with the tool. A spring 52 is seated on the tool 13 between the spiral 51 and the clutch 50.

The operation is as follows: The carriage 1 is run on the rails 3 so as to bring the tool 13 over the place to be drilled and secured to the rails in any preferred manner. The tool is fed down to the surface 53 of the material to be drilled. When the tool is in this position the top of the cap should be as shown on the drawings, that is, at a height to receive a blow from the hammer when its working face 54 is horizontal or at right angles to the length of the tool. In this position of the cap 36 the spring 51 will push the clutch ring 50 up so as to allow the tool to reciprocate freely through the sleeve 12. When the cap is in the position described the upper face of the yoke 37 comes into contact with the index finger 55. Other devices may be used to show when the drilling tool and the hammer are in proper relative position; for example, the mirror 56 might be used, or some other part movable with the tool might carry that part of the index corresponding to the yoke 37 while the finger 55 could be placed so as to coöperate with it. The hammer 35 strikes the cap 36 very rapidly and at each blow retires within the recess 34 so as to permit the hammer to pass the cap. After passing the cap the hammer again flies out and delivers another blow and so on until the drilling operation has been completed. It is readily seen that, if the cap be too low the corner of the hammer will strike the cap so as to form a toggle of the pin 43, the hammer 35, and the cap, whereby serious damage may result to the machine. It is therefore essential that the feed-screw be rotated sufficiently fast during the drilling as to maintain the hammer and the tool in the working position hereinabove described. The operator knows that these parts are in correct position by watching the index finger, or the mirror or other indicating device. During the drilling operation the drill tool will be rotated and the spiral 51 will bring the cuttings up on the face of the material 53. When the hole has been drilled the feed-screw is reversed. This causes the carriage to move up away from the drill slightly, but the clutch 50 soon tilts down and grips the tool, causing it thenceforth to travel up with the carriage 6. The carriage may be raised leaving the drill in the drilled hole if the clutch 50 be prevented from tilting. When the carriage 6 has been raised so that the sleeve 12 passes above the upper end of the tool, the carriage 1 may be run along the track so that the tool may be lifted out of the hole without obstruction from any part of the machine. It will be noticed that I have provided a recess in the bed plate of the carriage 1 to permit the latter to move on the tracks independently of the tool 13, one of the front truck wheels being placed at the rear of the drill. However, it is not essential that so much of the bed plate be removed, as only enough space is required to clear the drilling tool. The wall 40 and the face 54 are so related that the hammer cannot swing in advance of the preferred working position of the hammer. The cap 36 may be made longer, if desired, and may even enter the sleeve 12, thereby permitting shorter drilling tools to be used. Other means than the disks 47 may be provided to retain the pin 43 in the head 33 and other means may be devised for preventing the rotation of said pin, without departing from the spirit of my invention.

Various changes than those specified may be made and yet preserve the principles of my invention.

I claim—

1. In a drilling machine, a carriage, a drilling tool thereon, means for rotating the tool, a centrifugal hammer for driving the tool, a clutch adapted to engage and lift the tool when the carriage rises, and means for releasing the clutch when the drill is in operative position relative to the hammer.

2. In a drilling machine, a carriage, a drilling tool thereon, means for rotating the tool, a centrifugal hammer for driving the tool, a clutch adapted to engage and lift the tool when the carriage rises, a spiral on said tool and rotatable therewith, and a spring between the spiral and the clutch.

3. In a drilling machine, a carriage, a drilling tool thereon, means for rotating the tool, a centrifugal hammer for driving the tool, a clutch adapted to engage and lift the tool when the carriage rises, a spiral slidable on said tool and rotatable therewith, and a spring between the spiral and the clutch to release the clutch and cushion the rebound of the tool.

4. In a drilling machine, a centrifugal hammer, a drilling tool coöperable therewith, and a removable cap in engagement with the tool to receive the blows of the hammer.

5. In a drilling machine, a centrifugal hammer, a drilling tool coöperable therewith, a removable cap in engagement with the tool to receive the blows of the hammer, and yielding means for holding the cap and the tool in contact.

6. In a drilling machine, a drilling tool, a centrifugal hammer coöperable therewith, means for keeping the hammer and tool in correct working position during the drilling operation, and means whereby the operator may ascertain the relative position of the said tool and hammer.

7. In a drilling machine, a drilling tool, a centrifugal hammer coöperable therewith, means for keeping the hammer and tool in correct working position during the drilling operation, and means for indicating to the operator when the tool and hammer are in said working position.

8. In a drilling machine, a reciprocating carriage, a drilling tool thereon, means for rotating the tool, a clutch adapted to lift the tool when the carriage rises, and a spiral on said tool, said spiral having a projecting portion in engagement with the side of the bit of the tool to cause the spiral to rotate with the tool.

9. In a drilling machine, a reciprocating carriage, a drilling tool thereon, means for rotating the tool, means adapted to lift the tool when the carriage rises, and a spiral on said tool, said spiral having a projecting portion in engagement with the side of the bit of the tool to cause the spiral to rotate with the tool.

Signed at Cleveland, Ohio, this 1st day of Dec. 1906.

BENJAMIN HASTINGS.

Witnesses:
C. W. COMSTOCK,
A. C. VAUPEL.